(12) United States Patent
Hunt

(10) Patent No.: US 10,438,337 B2
(45) Date of Patent: *Oct. 8, 2019

(54) ACTIVE REAL-TIME CHARACTERIZATION SYSTEM UTILIZING BEAM SCANNING FOR SURFACE IMAGING

(71) Applicant: The Boeing Company, Chicago, IL (US)

(72) Inventor: Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/902,127

(22) Filed: Feb. 22, 2018

(65) Prior Publication Data
US 2019/0259149 A1 Aug. 22, 2019

(51) Int. Cl.
*G06T 7/00* (2017.01)
*H04N 5/225* (2006.01)
*H04N 5/33* (2006.01)
*H04N 5/247* (2006.01)

(52) U.S. Cl.
CPC ......... *G06T 7/0004* (2013.01); *H04N 5/2256* (2013.01); *H04N 5/247* (2013.01); *H04N 5/332* (2013.01); *G06T 2207/10048* (2013.01); *G06T 2207/10152* (2013.01); *G06T 2207/30164* (2013.01)

(58) Field of Classification Search
CPC combination set(s) only.
See application file for complete search history.

(56) References Cited

U.S. PATENT DOCUMENTS

| 5,710,429 | A | * | 1/1998 | Alfano | G01N 21/49 250/330 |
|---|---|---|---|---|---|
| 5,973,778 | A | | 10/1999 | Hunt | |
| 6,781,686 | B2 | * | 8/2004 | Hunt | G01N 21/17 250/559.4 |
| 6,788,405 | B2 | | 9/2004 | Hunt | |
| 6,795,175 | B2 | | 9/2004 | Hunt | |
| 6,798,502 | B2 | | 9/2004 | Hunt | |
| 6,819,844 | B2 | | 11/2004 | Hunt | |
| 7,289,656 | B2 | * | 10/2007 | Engelbart | G01N 21/95 382/141 |
| 7,304,305 | B2 | | 12/2007 | Hunt | |
| 7,757,558 | B2 | | 7/2010 | Bossi et al. | |
| 7,983,469 | B2 | | 7/2011 | Engelbart et al. | |

(Continued)

*Primary Examiner* — Janese Duley
(74) *Attorney, Agent, or Firm* — Toler Law Group, PC

(57) ABSTRACT

A system and method for providing active real-time characterization of an article under test. A first scan assembly moves an infrared light source and an first visible light source so that a beam of coherent infrared light and a first beam of visible light move across a surface of an article under test in a raster pattern. A second scan assembly moves a visible light camera, a visible light second harmonic generation camera, an infrared camera, an infrared second harmonic generation camera, and the sum-frequency camera so that each camera receives a respective predetermined return beam of light from the surface of the article under test. A processor receives signals from each camera and generates an image of mechanical properties of the surface of the article under test based on such signals.

20 Claims, 5 Drawing Sheets

(56) References Cited

U.S. PATENT DOCUMENTS

| | | |
|---|---|---|
| 8,664,583 B2 | 3/2014 | Hunt et al. |
| 8,789,837 B2 | 7/2014 | Chang et al. |
| 2009/0116707 A1* | 5/2009 | Sutko .................. G06K 9/00134 |
| | | 382/128 |
| 2013/0048841 A1 | 2/2013 | Hunt et al. |
| 2013/0050685 A1 | 2/2013 | Hunt et al. |
| 2016/0119557 A1 | 4/2016 | Hunt et al. |

* cited by examiner

ACTIVE REAL-TIME CHARACTERIZATION SYSTEM UTILIZING BEAM SCANNING FOR SURFACE IMAGING

FIELD

This disclosure relates generally to an active real-time characterization system that uses beam scanning to perform surface imaging.

BACKGROUND

It can be extremely difficult to monitor the growth of thin films, particularly if there is a need for to obtain two-dimensional imaging of the surface mechanical properties. Surface and interface coverages of only a few molecular layers are particularly difficult to sense. The surface mechanical properties, such as thickness, roughness, etc., are particularly difficult to determine given the small signal to background ratios associated with those films, surfaces and interfaces.

The only means to perform this type of metrology in an in-situ format is to use optical technologies, such as microscopy. But these optical technologies rely on linear optical responses, which are not optimal for surface characterization. As a result, existing solutions are mostly based on heuristic and historical processes. There are some in-situ diagnostic solutions which can show that a characteristic has changed, but these solutions are incapable of identifying what characteristic has changed.

Accordingly, there is a need for a testing system which addresses the drawbacks identified above.

SUMMARY

In a first aspect, a system that provides active real-time characterization of an article under test. An infrared light source outputs a beam of coherent infrared light. A first visible light source outputs a first beam of coherent visible light. A first scan assembly has the infrared light source and the first visible light source mounted thereon. The first scan assembly moves the infrared light source and the first visible light source so that the beam of coherent infrared light and the first beam of visible light move across a surface of an article under test in a raster pattern. The system also includes a visible light camera, a visible light second harmonic generation camera, an infrared camera, an infrared second harmonic generation camera; and a sum-frequency camera. A second scan assembly has the visible light camera, the visible light second harmonic generation camera, the infrared camera, the infrared second harmonic generation camera, and the sum-frequency camera mounted thereon. The second scan assembly moves the visible light camera, the visible light second harmonic generation camera, the infrared camera, the infrared second harmonic generation camera, and the sum-frequency camera so that each camera receives a respective predetermined return beam of light from the surface of the article under test. A processor is coupled to receive signals from the visible light camera, the visible light second harmonic generation camera, the infrared camera, the infrared second harmonic generation camera and the sum-frequency camera. The processor generates an image of mechanical properties of the surface of the article under test based on such signals.

In a further aspect, the system includes a second visible light source for outputting a second beam of coherent visible light. The second visible light source may be mounted on the first scan assembly. The first scan assembly may move the second visible light source so that the second beam of visible light moves across a surface of an article under test in a raster pattern. The system may also include a third-order camera mounted on the second scan assembly. The second scan assembly may move the third-order camera so that the third-order camera receives a predetermined return beam of light from the surface of the article under test. Finally, the processor may receive signals from the third-order camera and use such signals in generating the image of mechanical properties of the surface of the article under test.

In a second aspect, a system for providing active real-time characterization of an article under test. The system includes an infrared light source for outputting a beam of coherent infrared light and a first visible light source for outputting a first beam of coherent visible light. A first scan assembly has the infrared light source and the first visible light sourced mounted thereon. The first scan assembly moves the infrared light source and the first visible light source so that the beam of coherent infrared light and the first beam of visible light move across a surface of an article under test in a raster pattern. the system also includes a visible light camera, a visible light second harmonic generation camera, an infrared camera, an infrared second harmonic generation camera, and a third-order camera. A second scan assembly has the visible light camera, the visible light second harmonic generation camera, the infrared camera, the infrared second harmonic generation camera, and the third-order camera mounted thereon. The second scan assembly moves the visible light camera, the visible light second harmonic generation camera, the infrared camera, the infrared second harmonic generation camera, and the third-order camera so that each camera receives a respective predetermined return beam of light from the surface of the article under test. A processor receives signals from the visible light camera, the visible light second harmonic generation camera, the infrared camera, the infrared second harmonic generation camera and the third-order camera. The processor generates an image of mechanical properties of the surface of the article under test based on such signals.

In a further embodiment, a second visible light source may output a second beam of coherent visible light. The second visible light source may be mounted on the first scan assembly. The first scan assembly may move the second visible light source so that the second beam of visible light moves across a surface of an article under test in a raster pattern. The second scan assembly may move a sum-frequency camera so that the sum-frequency camera receives a predetermined return beam of light from the surface of the article under test. The processor may be coupled to receive signals from the sum-frequency camera and to use such signals in generating the image of mechanical properties of the surface of the article under test.

In a third aspect, a method for active real-time characterization of an article under test. A beam of coherent light from an infrared light source and a first beam of visible light from a first visible light source are scanned in a raster pattern over a surface of an article under test. A visible light camera, a visible light second harmonic generation camera, an infrared camera, an infrared second harmonic generation camera and a sum-frequency camera are moved to receive light from the infrared light source and first visible light source reflected from the surface of the article under test. Signals from each of the cameras based on the received light are acquired. Finally, an image of mechanical properties of the surface of the article under test is generated based on the received signals.

In a further embodiment, a second beam of visible light from a second visible light source may be scanned in a raster pattern over the surface of the article under test. A third-order camera may be moved to receive light from the first visible light source and the second visible light source reflected from the surface of the article under test. Signals may be acquired from the third-order camera. The signals from the third-order camera may be used in generating the image of mechanical properties of the surface of the article under test.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1A:
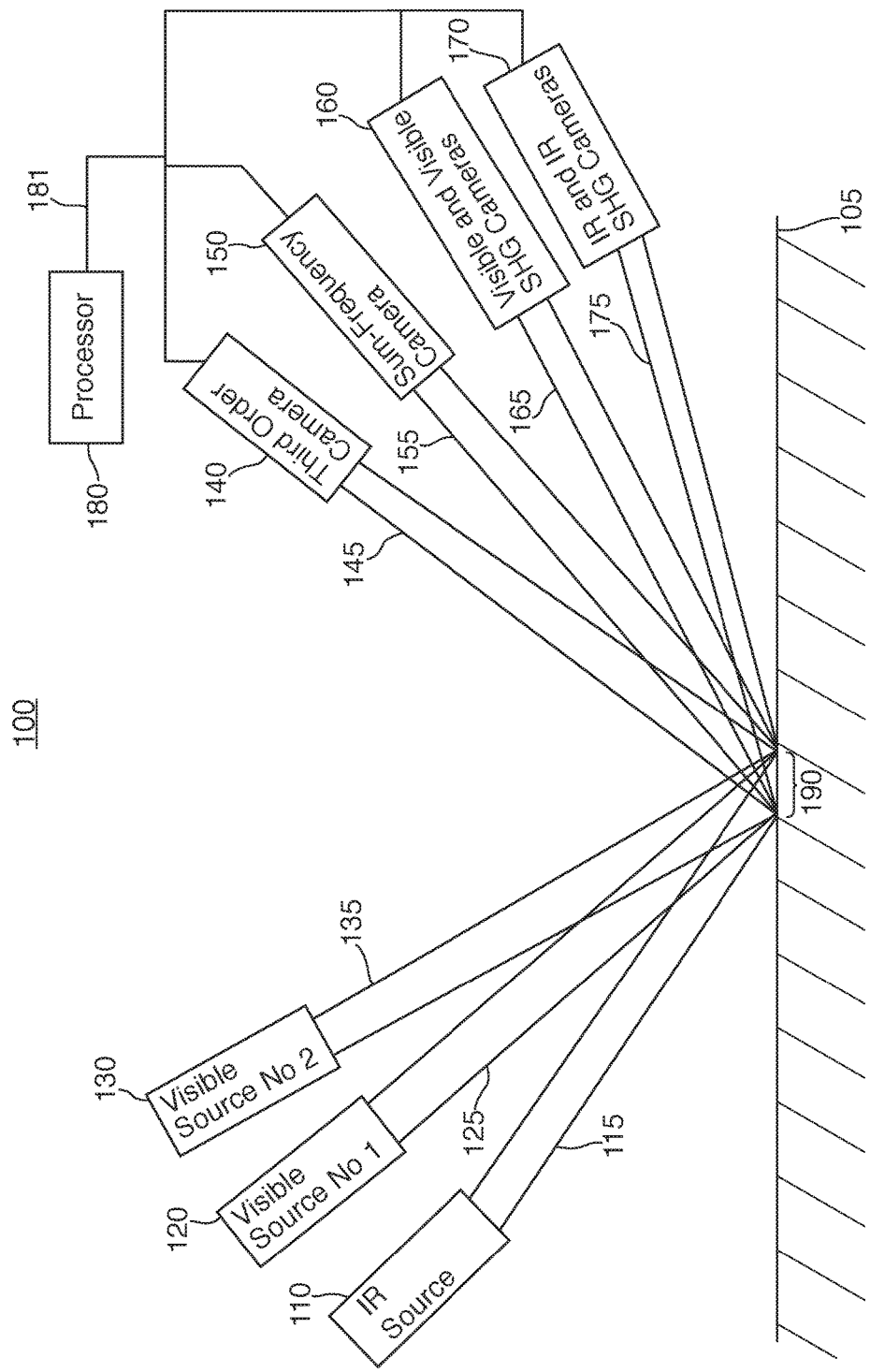
FIG. 1A is a block diagram of an active real-time characterization system for performing surface imaging using beam scanning according to an aspect of the present disclosure.

Referring now to FIG. 1A, the active real-time characterization system 100 of the present disclosure includes an infrared (IR) light source 110, a first visible light source 120 and a second visible light source 130. Each of the light sources 110, 120, 130 is positioned to direct a beam of coherent light at an area 190 on a surface of an article under test 105, e.g., a part constructed from carbon-fiber composites. In particular, IR source 110 is positioned to direct a coherent beam of light 115 at area 190, first visible light source 120 is positioned to direct a coherent beam of light 125 at area 190, and send visible light source 130 is positioned to direct a coherent beam of light 135 at area 190. The beams 115, 125, 135 may be emitted directly from the respective light sources 110, 120, 130 or may be emitted via respective optical fibers (and appropriate lenses, etc.) coupled to the light sources 110, 120, 130. When beams 115, 125, 135 are emitted via respective optical fibers, each light source 110, 120 130 consists of a laser of the appropriate type (visible or IR light) that is coupled to an input of an associated optical fiber via input optics. The laser is preferably a solid state laser or a diode laser and may be, for example, a diode laser, a continuous-wave diode laser, a solid state laser, a continuous-wave solid state laser, a flash-lamp pumped solid state laser, or a diode pumped solid state laser. The input optics consist of an input polarizer, an input wavelength discriminator, an input spatial filter and an input propagation optics. The input polarizer is, for example, a Brewster angle polarizer, a thin film polarizer, a Glan-air or Glan-Thompson polarizer or other crystal polarizer. The wavelength discriminator is, for example, a color filter, a dielectric film, a holographic transmission filter, or a grating. The input propagation optics is formed of one or more refractive or reflective optics which, when used in combination, control the divergence or convergence of the beam as it propagates towards the first input optical fiber. The input optics are optimized for the wavelength of the associated optical source. Coupling optics are coupled to an output of each optical fiber to direct the beam to area 190. IR light source 110 is configured to output light at a fixed, predetermined IR wavelength, while first visible light source 120 is configured to output light at a first fixed, predetermined visible wavelength and second visible light source 130 is configured to output light at a second fixed, predetermined visible wavelength, different from the first fixed, predetermined visible wavelength.

Figure 2:
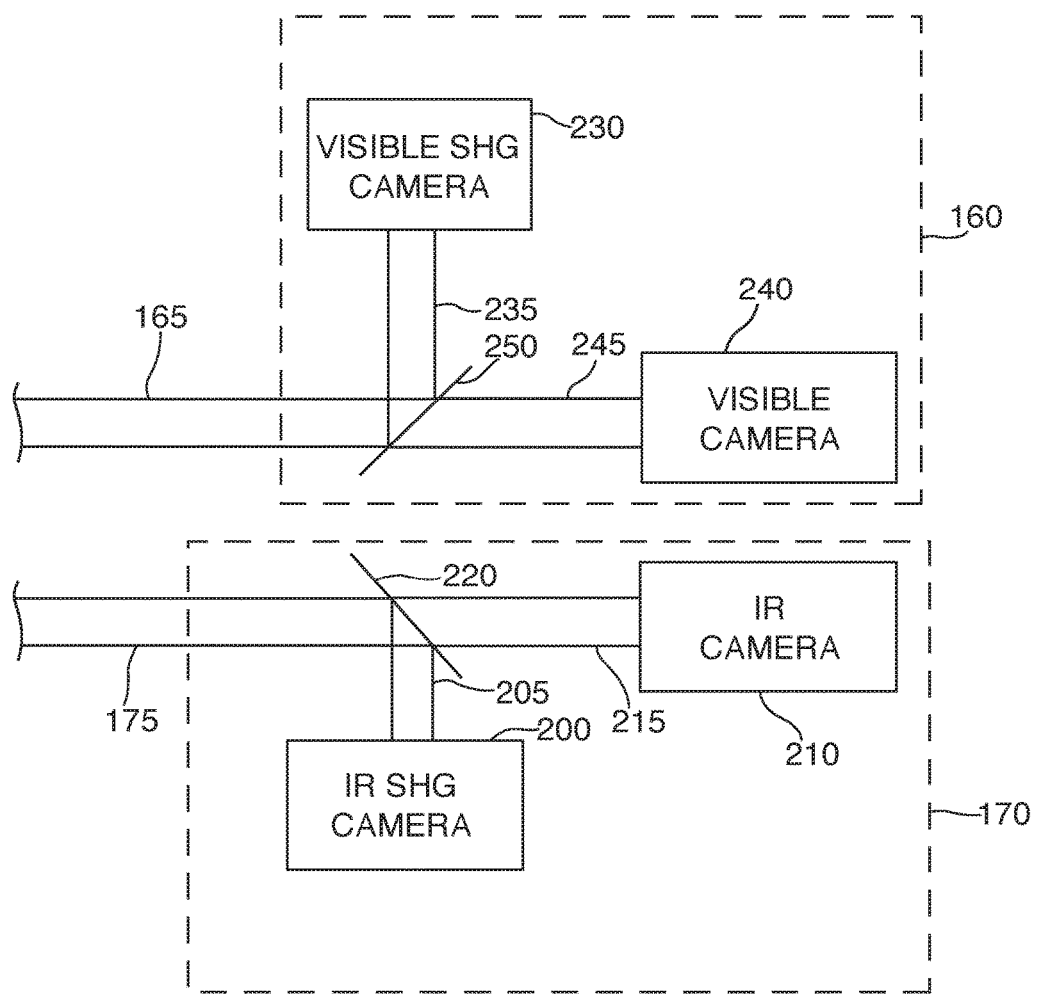
FIG. 2 is a block diagram showing the composition of the infrared light and visible light camera systems according to an aspect of the present disclosure.

System 100 in FIG. 1A also includes a number of cameras for detecting light reflected from the surface of article under test 105, including a Raman (third-order) camera 140 which receives a light beam 145 and a sum-frequency camera 150 which receives a light beam 155. System 100 also includes paired visible and visible second harmonic generation (SHG) cameras 160 which receive a light beam 165, and paired IR and IR SHG cameras 170 which receive a light beam 175. Referring now to FIG. 2, the paired visible light and visible light second harmonic generation (SHG) cameras 160 include a visible light SHG camera 230 and a visible light camera 240 which are positioned to each receive light beam 165 via a beam splitter 250. In particular, beam splitter 250 is positioned to split light beam 165 into a first portion 235 that is provided to visible light SHG camera 230 and a second portion 245 that is provided to visible light camera 240. Similarly, the paired IR and IR second harmonic generation (SHG) cameras 170 include an IR SHG camera 200 and an IR camera 210 which are positioned to each receive light beam 175 via a beam splitter 220. In particular, beam splitter 220 is positioned to split light beam 175 into a first portion 205 that is provided to IR SHG camera 200 and a second portion 215 that is provided to IR camera 210. Each of the cameras 140, 150, 200, 210, 230 and 240 produces an output signal that is communicated in a conventional manner to a processor 180 in FIG. 1A via a link 181 for processing as discussed below. As also discussed below, the reflected light beams 145, 155, 165 and 175 are at a particular angle with respect to the surface of device under test 105 based on the fixed angles that light beams 115, 125 and 135 are directed at the surface of device under test 105. The cameras 140, 150, 200, 210, 230 and 240 are thus positioned to receive such light beams. Each camera 140, 150, 200, 210, 230, 240 is a conventional detector as defined below with respect to FIG. 4.

Figure 1B:
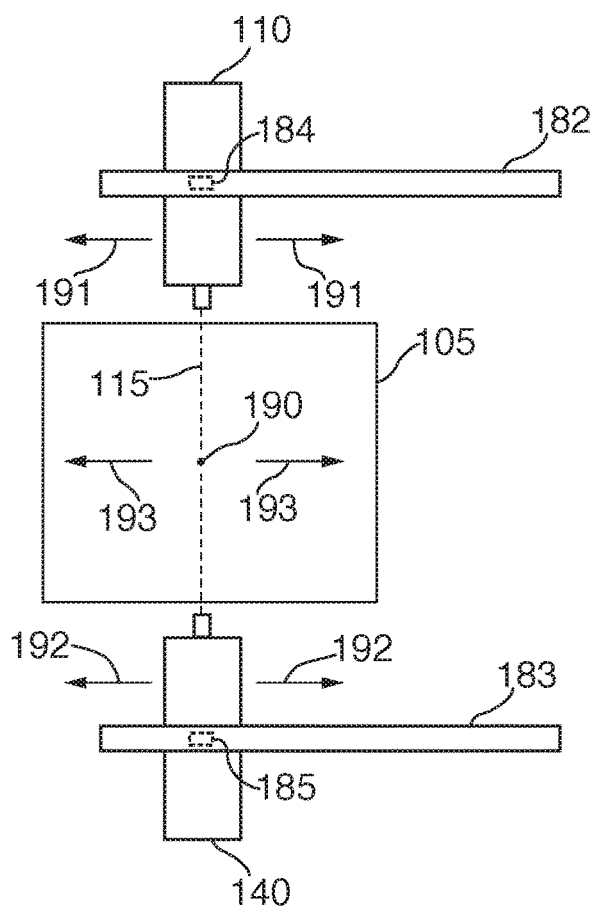
FIGS. 1B and 1C are block diagrams of a particular aspect of the active real-time characterization system of the present disclosure.
Figure 1C:
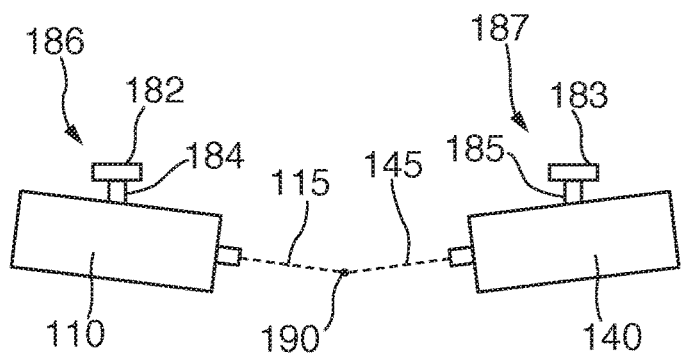

Referring now to FIGS. 1B and 1C, light source 110 is shown mounted on a first scan assembly 186 consisting of a first track assembly 182 and an associated x-y pivot assembly 184. Camera 140 is shown mounted on a second scan assembly 187 consisting of a second track assembly 183 and an associated x-y pivot assembly 185. The first scan assembly 186 and the second scan assembly 187 are mounted over an area where article under test 105 is positioned for testing and are coupled to processor 180 via a link not shown in the figures. Although not shown in FIGS. 1B and 1C, the other light sources (i.e., light sources 120, 130) are also mounted to first track assembly 186 via associated x-y pivot assemblies and the other cameras (i.e., cameras 150, 200, 210, 230, 240) are also mounted to second track assembly 187 via associated x-y pivot assemblies. The first scan assembly 186 moves light source 110, under the control of processor 180, so that light beam 115 moves laterally across the surface of the article under test 105 (i.e., point 190 moves in a lateral direction shown by arrows 193) in a raster pattern. The second scan assembly 187 moves camera 140, under the control of processor 180, so that return light beam 145 is received at camera 140. This movement allows system 100 to perform surface imaging, including the characterization of the surface thickness, roughness, and other mechanical properties. In operation, light source 110 is moved laterally along first track assembly 182 (as shown by arrows 191) while camera 140 moves laterally along second track assembly 183 (as shown by arrows 192). This allows the point 190 to move in a raster pattern along the surface of the article under test 105, and to reflect as light beam 145 to camera 140 from that surface. In some cases, the movement along the two track assemblies 182, 183 of respective light source 110 an camera 140 may be enough to generate the appropriate raster pattern for point 190 and ensure that return light beam 145 is directed at camera 140, while in other cases the x-y pivot assemblies 184, 185 may also be necessary to ensure that the return light beam 145 is received at camera 140.

Figure 3:
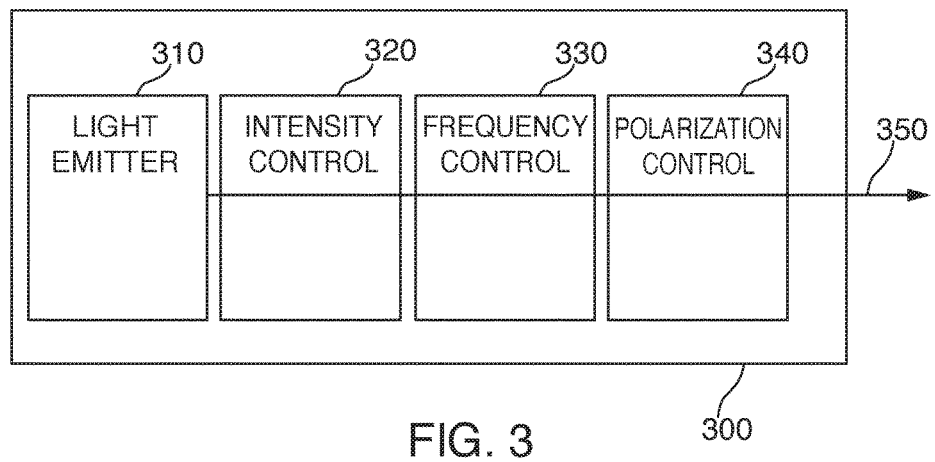
FIG. 3 is a block diagram showing the composition of the light sources according to an aspect of the present disclosure.

Referring now to FIG. 3, each of the light sources 110, 120, 130 is configured similarly, as shown by representative light source 300, but each may be configured for a different intensity, frequency and/or polarization. Light source 300 includes a light emitter 310, an intensity control 320, a frequency control 330 and a polarization control 340 for outputting a light beam 350. Light emitter 310 is preferably a narrow frequency bandwidth visible pulse laser and, may be, for example a pulsed diode laser, a continuous wave diode laser or a pulsed solid state laser or a continuous wave solid state laser. Intensity controls may include broadband filters for reducing intensity or may specifically refer to certain frequency notch filters which are intended to drop intensity levels where the detectors can act in a linear fashion. Frequency controls can be accomplished in simple cases by frequency dependent color filters or notch filters and in more elaborate by a spectrophotometer that is typically composed of a diffraction grating which operates at a frequency or bandwidth of interest. The key point for the frequency control is to ensure that only light in beam 350 is directed at the surface 105 and that stray light produced by light emitter 310 is removed, and as one of ordinary skill in the art will readily recognize, other frequency selective elements may also be used. Polarization control typically consists of two separate optical elements, a polarizer which only passes light of one polarization and a polarization modifying element—typically a halfway plate or a quarter wave plate. A halfway plate is used to rotate the polarization to the desired orientation. A quarter wave plate is used to change the polarization from linear to circular or from circular to linear as needed. As shown, the polarizer is the last element before light beam 350 leaves the source and heads for the surface 105. Each light source 110, 120, 130 is configured, based on the selection of light emitter 310, intensity control 320, frequency control 330 and polarization control 340 in each to provide a respective coherent beam of light 115, 125, 135.

Figure 4:
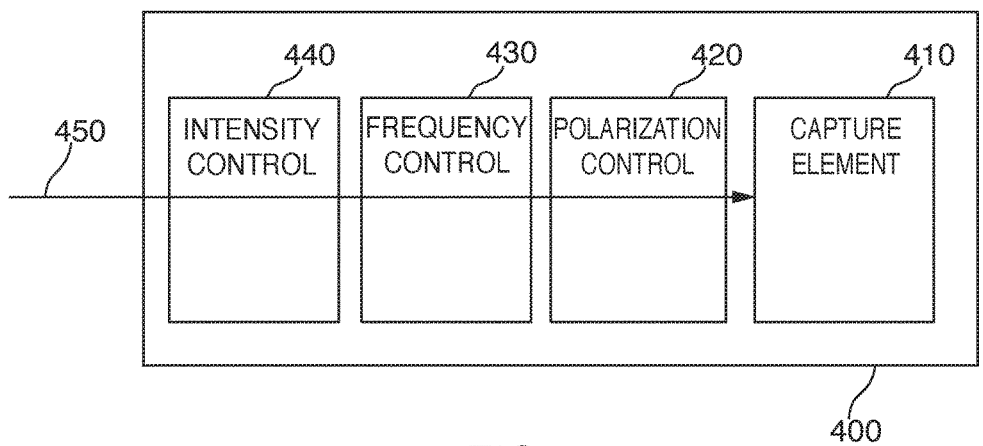
FIG. 4 is a block diagram showing the composition of the cameras according to an aspect of the present disclosure.

Referring now to FIG. 4, each of the cameras 140, 150, 200, 210, 230 and 240 is configured similarly, as shown by representative camera 400. Camera 400 includes a capture element 410, a polarization control 420, a frequency control 430 and an intensity control 440 for receiving light beam 450. Exemplary capture elements 34 include, without limitation, cameras, CCD devices, imaging arrays, photometers, and like devices. The frequency control 430 and intensity control 440 operate on light beam 450 in a similar manner as intensity control 320 and frequency control 330 operate on light beam 350 as discussed above. Preferably, polarization control 420 consists of a half wave plate and quarter wave combination, followed by a polarizer.

In operation, the system 100 shown in FIG. 1A provides a combination of linear infrared spectroscopy, second order surface frequency mixing spectroscopy, and third-order non-linear optics (e.g., Raman spectroscopy) spectroscopy. System 100 provides a number of ways of performing species identification and allows the cross correlation between the three types of spectroscopies in order to avoid false negative spectral features.

In particular, visible light source 120 and IR light source 110 are configured and positioned to provide light signals which allow the processor 180 to generate simultaneous linear (same frequency) and non-linear (second harmonic generation) real time spectroscopic signals, in conjunction with paired visible light and visible light second harmonic generation (SHG) cameras 160 and paired IR and IR SHG cameras 170. As one of ordinary skill in the art will readily recognize, paired visible light and visible light second harmonic generation (SHG) cameras 160 and paired IR and IR SHG cameras 170 are positioned at a particular predetermined angle to receive the appropriate respective return light beams 165, 175 from surface 105.

Further, visible light source 120 and IR light source 110 are also configured and positioned to provide light signals which allow the processor 180 to generate a sum-frequency ($\omega_{IR}+\omega_{VISIBLE}$) real-time spectroscopic signal, in conjunction with sum-frequency camera 150. As one of ordinary skill in the art will readily recognize, sum-frequency camera 140 is positioned at a particular predetermined angle to receive the appropriate return light signals 155 from surface 105.

Next, visible light source 120 and visible light source 130 are configured and positioned to provide light signals which allow the processor 180 to generate a third-order ($2\omega_{VIS1}-\omega_{VIS2}$) (e.g., Raman) real-time spectroscopic signal, in conjunction with Raman (third-order) camera 140. As one of ordinary skill in the art will readily recognize, Raman (third-order) camera 140 is positioned at a particular predetermined angle to receive the appropriate return light beam 145 from surface 105.

The processor 180 is coupled via link 181 to receive signals from each of cameras 140, 150, 200, 210, 230 and 240 and is configured to calculate in real time a linear spectroscopic signal, a second harmonic generation spectroscopic signal, a sum-frequency spectroscopic signal and a third-order spectroscopic signal. Based on such signals, processor 18 generates a scan image of the article under test. Processor 180 may be configured to provide course scanning, which obtains a large throw but is slow, or fine scanning, which results in faster scanning and more precise imaging. System 100 relies on the fact that nonlinear processes are coherent processes at a surface or interface. Thus, surface phase matching constraints apply and an extended illumination area maintains a two-dimensional registration in the nonlinear optical interactions that occur at the surface. As a result, signals that come from such nonlinear optical interactions allow a surface image to be built as a function of surface properties. This enables processor 180 to generate an image of mechanical properties, such as thickness or roughness for example, with sensitivity that cannot be achieved with linear techniques.

Figure 5:
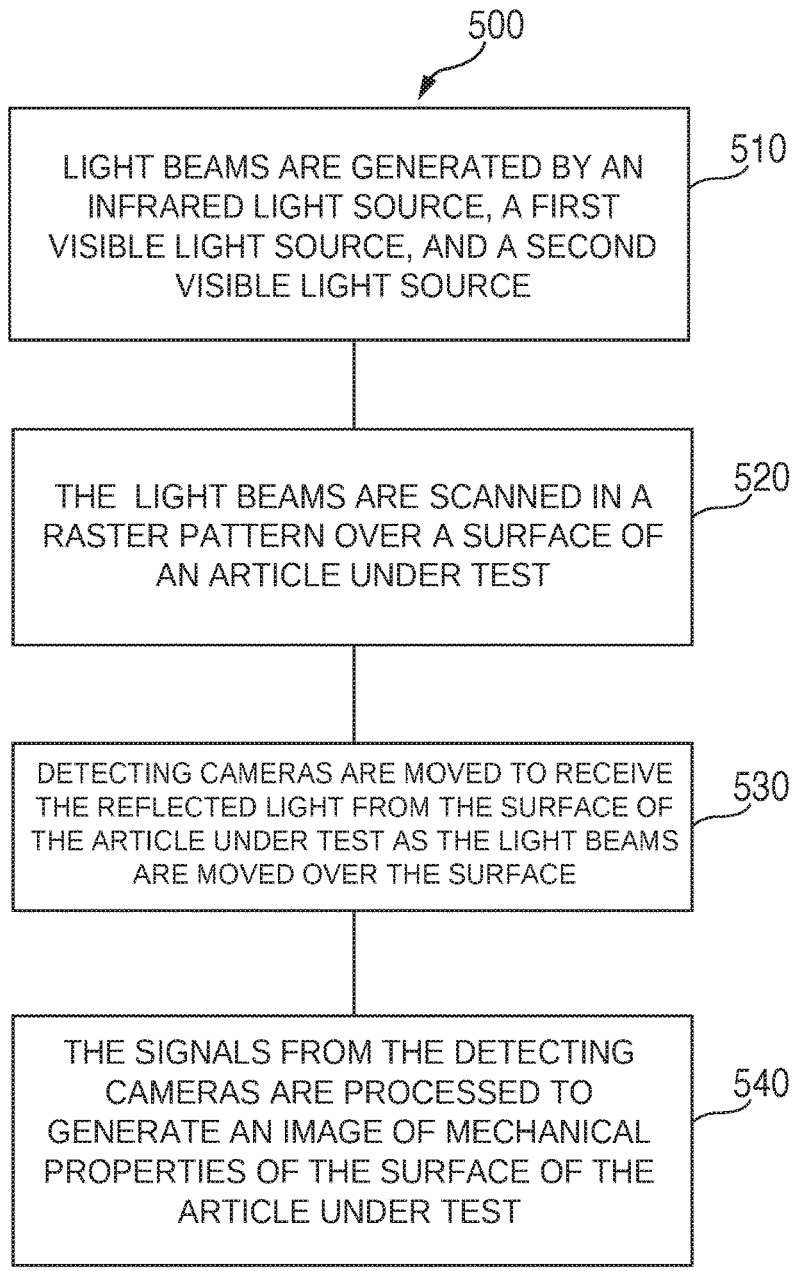
FIG. 5 is a flow chart of a method for operating the active real-time characterization system of the present disclosure.

Referring now to FIG. 5, a flow chart 500 of a method for operating the active real-time characterization system of the present disclosure is shown. In step 510, light beams are generated by an infrared light source, a first visible light source and a second visible light source. Next, at step 520, the light sources are moved so that the respective light beams therefrom are moved in a raster pattern over a surface of an article under test. Further, at step 530, the detecting cameras are moved in a manner corresponding to the movement of the light sources so that the reflected light beams from the surface of the article under test are received at each of the detecting cameras. Finally, at step 540, signals from the detecting cameras are processed to generate an image showing mechanical properties of the surface of the article under test.

In further embodiments, the data generated by the active-real time characterization system 100 of the present disclosure may be combined for analysis with data separately generated by way of UV-VIS-NIR spectroscopy, IR spectroscopy, microwave spectroscopy, THz spectroscopy, ultrasonic NDE/NDI, Raman spectroscopy, Brillouin spectroscopy and/or ellipsometry.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for providing active real-time characterization of an article under test, comprising:
   an infrared light source for outputting a beam of coherent infrared light;
   a first visible light source for outputting a first beam of coherent visible light;
   a first scan assembly having the infrared light source and the first visible light source mounted thereon, the first scan assembly adapted to move the infrared light source and the first visible light source so that the beam of coherent infrared light and the first beam of coherent visible light move across a surface of an article under test;
   a visible light camera and a visible light second harmonic generation camera;
   an infrared camera and an infrared second harmonic generation camera;
   a sum-frequency camera;
   a second scan assembly having the visible light camera, the visible light second harmonic generation camera, the infrared camera, the infrared second harmonic generation camera, and the sum-frequency camera mounted thereon, the second scan assembly adapted to move the visible light camera, the visible light second harmonic generation camera, the infrared camera, the infrared second harmonic generation camera, and the sum-frequency camera so that each camera receives a respective predetermined return beam of light from the surface of the article under test; and
   a processor configured to receive first signals from the visible light camera, the visible light second harmonic generation camera, the infrared camera, the infrared second harmonic generation camera and the sum-frequency camera, the processor configured to generate data indicative of properties of the surface of the article under test based on the first signals.

2. The system of claim 1, further comprising:
   a second visible light source for outputting a second beam of coherent visible light, the second visible light source mounted on the first scan assembly, the first scan assembly adapted to move the second visible light source so that the second beam of coherent visible light moves across a surface of an article under test;
   a third-order camera mounted on the second scan assembly, the second scan assembly adapted to move the third-order camera so that the third-order camera receives a predetermined return beam of light from the surface of the article under test; and
   wherein the processor is configured to receive second signals from the third-order camera and configured to use the second signals in generating the data indicative of properties of the surface of the article under test.

3. The system of claim 1, wherein the infrared light source and the first visible light source each includes an intensity control for setting a predetermined intensity for a respective output beam of light.

4. The system of claim 1, wherein the infrared light source and the first visible light source each includes a frequency control for setting a predetermined wavelength for a respective output beam of light.

5. The system of claim 1, wherein the infrared light source and the first visible light source each includes a polarization control for setting a predetermined polarization for a respective output beam of light.

6. The system of claim 1, wherein each of the visible light camera, the visible light second harmonic generation camera, the infrared camera, the infrared second harmonic generation camera, and the sum-frequency camera includes a capture element and an intensity control to filter a respective input beam of light directed towards the capture element to adjust an intensity of the respective input beam of light.

7. The system of claim 1, wherein each of the visible light camera, the visible light second harmonic generation camera, the infrared camera, the infrared second harmonic generation camera, and the sum-frequency camera includes a capture element and a frequency control to filter a respective input beam of light directed towards the capture element to adjust a wavelength of the respective input beam of light.

8. The system of claim 1, wherein each of the visible light camera, the visible light second harmonic generation camera, the infrared camera, the infrared second harmonic generation camera, and the sum-frequency camera includes a capture element and a polarization control to filter a respective input beam of light directed towards the capture element to adjust a polarization of the respective input beam of light.

9. The system of claim 1, further comprising a beam splitter configured to split a return beam of light into two portions and to direct a first portion to the visible light camera and a second portion to the visible light second harmonic generation camera.

10. A system for providing active real-time characterization of an article under test, comprising:
    an infrared light source for outputting a beam of coherent infrared light;
    a first visible light source for outputting a first beam of coherent visible light;

a first scan assembly having the infrared light source and the first visible light source mounted thereon, the first scan assembly adapted to move the infrared light source and the first visible light source so that the beam of coherent infrared light and the first beam of coherent visible light move across a surface of an article under test;

a visible light camera and a visible light second harmonic generation camera;

an infrared camera and an infrared second harmonic generation camera;

a third-order camera;

a second scan assembly having the visible light camera, the visible light second harmonic generation camera, the infrared camera, the infrared second harmonic generation camera, and the third-order camera mounted thereon, the second scan assembly adapted to move the visible light camera, the visible light second harmonic generation camera, the infrared camera, the infrared second harmonic generation camera, and the third-order camera so that each camera receives a respective predetermined return beam of light from the surface of the article under test; and a processor configured to receive first signals from the visible light camera, the visible light second harmonic generation camera, the infrared camera, the infrared second harmonic generation camera, and the third-order camera, the processor configured to generate data indicative of properties of the surface of the article under test based on the first signals.

11. The system of claim 10, further comprising:

a second visible light source for outputting a second beam of coherent visible light, the second visible light source mounted on the first scan assembly, the first scan assembly adapted to move the second visible light source so that the second beam of coherent visible light moves across a surface of an article under test;

a sum-frequency camera, the second scan assembly adapted to move the sum-frequency camera so that the sum-frequency camera receives a predetermined return beam of light from the surface of the article under test; and wherein the processor is configured to receive second signals from the sum-frequency camera and configured to use the second signals in generating the data indicative of properties of the surface of the article under test.

12. The system of claim 10, wherein the infrared light source and the first visible light source each includes an intensity control for setting a predetermined intensity for a respective output beam of light.

13. The system of claim 10, wherein the infrared light source and the first visible light source each includes a frequency control for setting a predetermined wavelength for a respective output beam of light.

14. The system of claim 10, wherein the infrared light source and the first visible light source each includes a polarization control for setting a predetermined polarization for a respective output beam of light.

15. The system of claim 10, wherein each of the visible light camera, the visible light second harmonic generation camera, the infrared camera, the infrared second harmonic generation camera, and the sum-frequency camera includes a capture element and an intensity control to filter a respective input beam of light directed towards the capture element to adjust an intensity of the respective input beam of light.

16. The system of claim 10, wherein each of the visible light camera, the visible light second harmonic generation camera, the infrared camera, the infrared second harmonic generation camera, and the sum-frequency camera includes a capture element and a frequency control to filter a respective input beam of light directed towards the capture element to adjust a wavelength of the respective input beam of light.

17. The system of claim 10, wherein each of the visible light camera, the visible light second harmonic generation camera, the infrared camera, the infrared second harmonic generation camera, and the sum-frequency camera includes a capture element and a polarization control to filter a respective input beam of light directed towards the capture element to adjust a polarization of the respective input beam of light.

18. The system of claim 10, further comprising a beam splitter configured to split a return beam of light into two portions; and to direct a first portion to the visible light camera and a second portion to the visible light second harmonic generation camera.

19. A method for active real-time characterization of an article under test, comprising:

scanning a beam of coherent light from an infrared light source and a first beam of coherent visible light from a first visible light source over a surface of an article under test;

moving a visible light camera, a visible light second harmonic generation camera, an infrared camera, an infrared second harmonic generation camera, and a sum-frequency camera to receive light from the infrared light source and first visible light source reflected from the surface of the article under test;

acquiring first signals from the visible light camera, the visible light second harmonic generation camera, the infrared camera, the infrared second harmonic generation camera, and the sum-frequency camera each based on the received light; and generating data indicative of properties of the surface of the article under test based on the received first signals.

20. The method of claim 19, further comprising:

scanning a second beam of coherent visible light from a second visible light source over the surface of the article under test;

moving a third-order camera to receive light from the first visible light source and the second visible light source reflected from the surface of the article under test;

acquiring second signals from the third-order camera; and using the second signals from the third-order camera in generating the data indicative of properties of the surface of the article under test.

* * * * *